G. W. CRIST.
HEATING SYSTEM FOR AUTOMOBILES.
APPLICATION FILED JAN. 6, 1916.
1,177,022.
Patented Mar. 28, 1916.
3 SHEETS—SHEET 3.
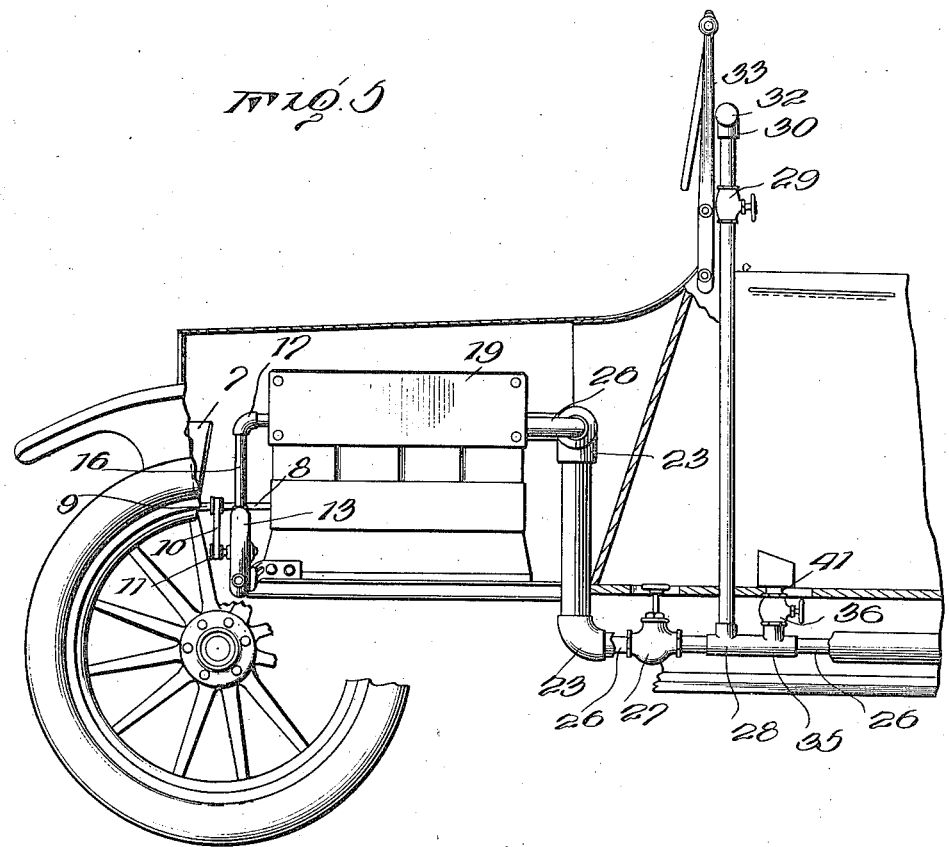
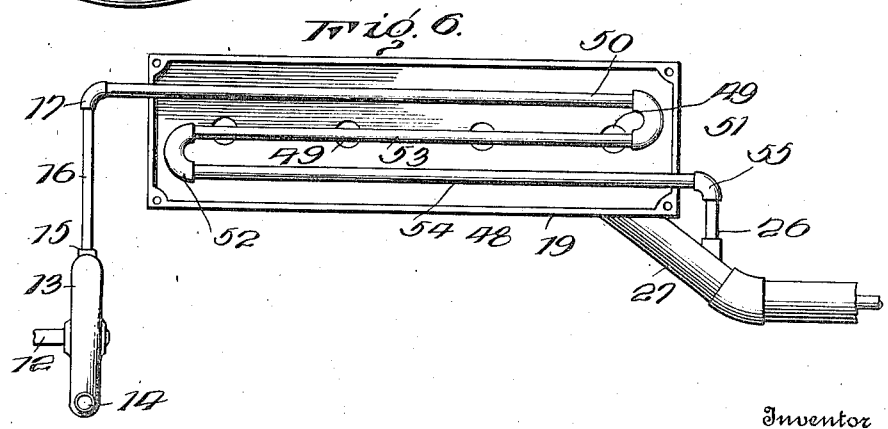

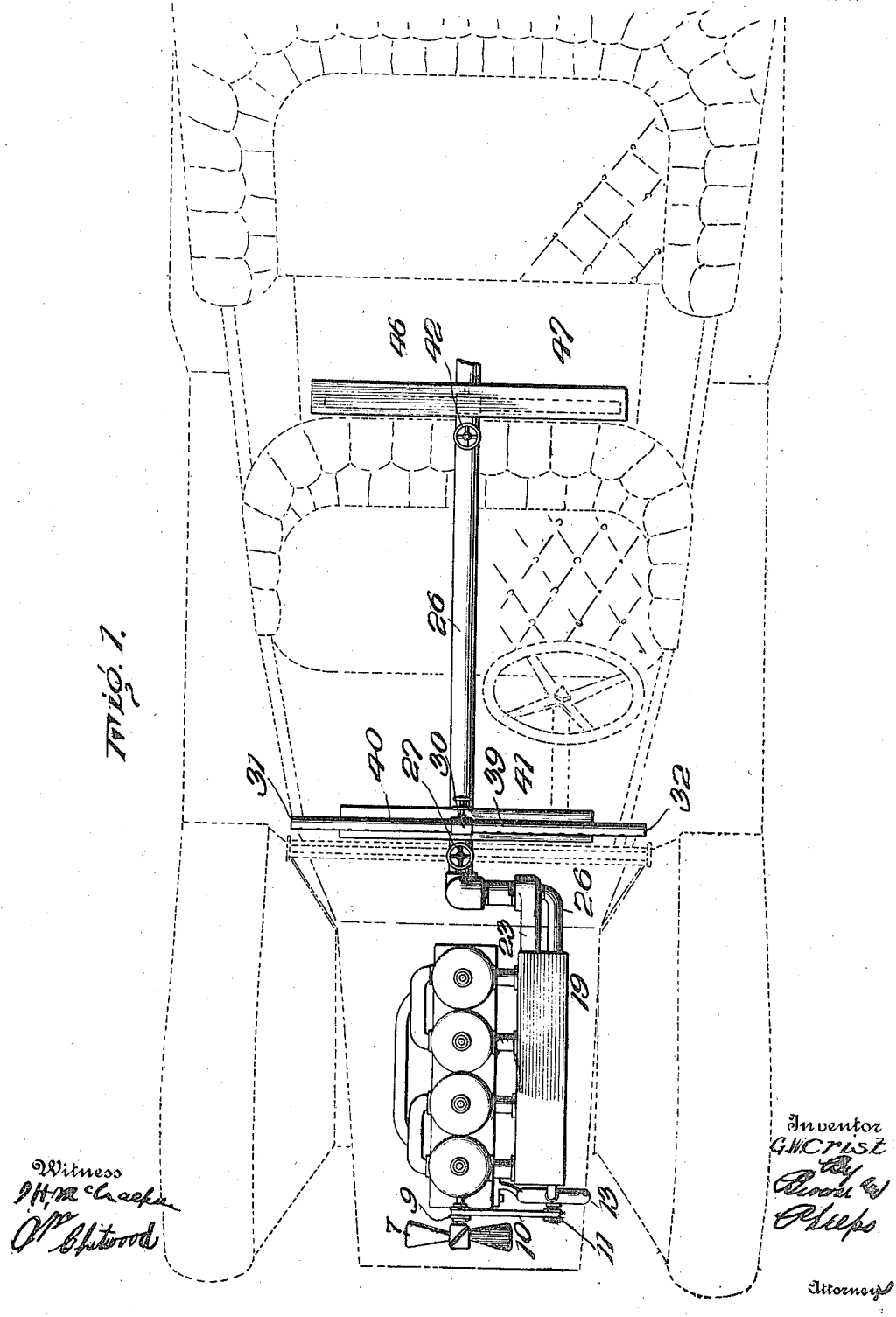

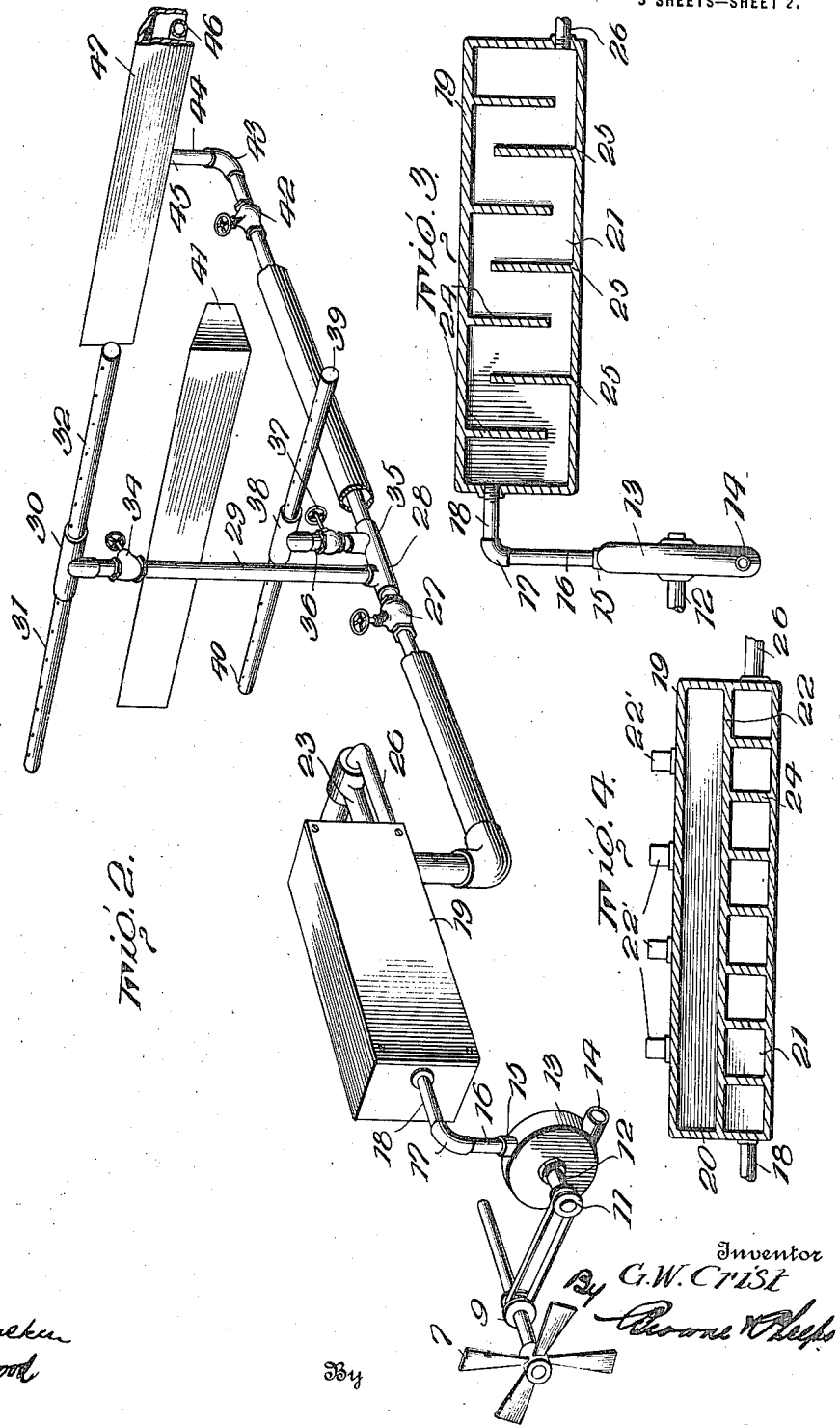

UNITED STATES PATENT OFFICE.

GEORGE W. CRIST, OF OSKALOOSA, IOWA.

HEATING SYSTEM FOR AUTOMOBILES.

1,177,022.  Specification of Letters Patent. Patented Mar. 28, 1916.

Application filed January 6, 1916. Serial No. 70,598.

*To all whom it may concern:*

Be it known that I, GEORGE W. CRIST, a citizen of the United States, residing at Oskaloosa, in the county of Mahaska and State of Iowa, have invented certain new and useful Improvements in Heating Systems for Automobiles, of which the following is a specification.

This invention relates to heating systems for automobiles and other vehicles, more particularly of that class in which the exhaust from the engine driving the vehicle is utilized to heat the vehicle indirectly through the medium of air supplied to radiators within the vehicle.

The primary object of this invention is the provision of means of the character set forth by which the exhaust itself is not directly utilized as a heating medium, but in which the exhaust is utilized to heat air which is in turn used as the heating medium.

Another object of this invention is to provide means whereby the exhaust does not come in contact with the air in order to prevent the escape of noxious gases or vapors into the interior of the car.

A still further object of this invention is to provide means whereby air is drawn into a chamber adjacent the exhaust manifold of the engine and therein heated and thence distributed to the various portions of the car in order to effectually warm the same.

With the foregoing and other objects in view as will hereinafter appear from time to time, this invention consists in the peculiar combination and arrangement of the various related elements of an automobile heater as hereinafter set forth and more particularly described in the appended claims.

Referring to the accompanying drawing forming a portion of this specification and in which the same reference characters indicate the same parts wherever used: Figure 1 is a top plan view of an automobile shown in dotted lines with the heating device attached thereto; Fig. 2 is a detail perspective of the heating system. Fig. 3 is a sectional side elevation through the heating box; Fig. 4 is a transverse section through Fig. 3. Fig. 5 is a side elevation partly in section showing the device in position and Fig. 6 is a section through a modified form of heating box.

The numeral 7 designates the usual cooling fan of the internal combustion engine driven by shaft 8 which in accordance with this invention is provided with a pulley 9, carrying a belt 10, adapted to drive a second pulley 11 upon a shaft 12 actuating a fan blower 13 provided with an inlet 14, an outlet 15, the outlet 15 carrying a piping extension 16 provided with an L 17 connected by means of a nipple 18 to a heating box 19 comprising two independent chambers 20 and 21 divided by a central longitudinal partition 22 the nipple 18 communicating with the chamber 21. The chamber 20 forms an exhaust manifold for the internal combustion engine by means of suitable connections 22' to the exhaust ports thereof and is provided with a suitable exhaust pipe 23.

Within the chamber 21 are a plurality of downwardly extending baffle plates 24 and a plurality of upwardly extending baffle plates 25 the two series of plates being arranged in staggered relation to form a tortuous passage in the direction of the arrows shown in Fig. 3 for the air forced into the chamber 21 by means of the blower 13. From the chamber 21 extends a pipe 26 which is inclosed by the exhaust pipe 23 which runs back beneath the floor of the car to the muffler, not shown.

The pipe 26 is provided with a valve 27 and a T 28 carrying a pipe extension 29 having thereon a T member 30 the arms of which support perforated pipes 31—32 which extend across the base of the windshield 33 to spray jets of warm air upon the windshield glass to prevent frosting thereof, the amount of air being regulated by a valve 34 carried by the pipe 29. Adjacent the T 28 is a second T 35 carrying a vertical pipe 36 having a valve 37 therein and supporting a T 38 the arms of which carry perforated pipes 39, 40 covered by means of a suitable casing 41 to provide a foot rest for the occupant of the front seat of the automobile.

From the T 35 extends the pipe 26 provided with a valve 42 and an L 43 having a nipple 44 provided with a T 45 having perforated piping extensions 46—46 carried thereby and covered by means of a casing 47 similar to the casing 41 to provide a foot rest for the occupants of the rear seat.

In the modification shown in Fig. 6 the heating box 19 comprises a single chamber 48 provided with suitable openings 49 for the exhaust ports and the L 17 carries a long pipe 50 entirely into the interior of the box and forming by means of U members 51—52 and piping 53—54 a coil communicating with the pipe 26 by an L 55 the exhaust pipe 23 being in the same relative position.

The operation of the system is as follows: Air is drawn in through the inlet pipe 14 by the blower 13 and forced through the chamber 21 of the heating box 19 in a tortuous course in the direction of the arrows in Fig. 3 where it is heated by coming in contact with the baffles 24—25 and the partition 22 which have been heated by means of the exhaust in the chamber 20 from whence the air passes through the piping connections 26 to the perforated pipes 31—32, to the windshield, and also to the perforated pipes 39, 40 and 46—46 and the corresponding casings 41—47 which are heated by the warm air from their respective pipes. Should it be desired to cut off the supply of heat from the windshield and from both the front and rear seat heaters, the valve 27 may be operated, or should it be desired to operate the heaters 30—41—47 singly, the valves 34—37—42 may be operated to give the desired result. In order that the heating device may be placed in inoperative relation with the engine without removing the device from the car the belt 10 may be disengaged from the pulleys 9—11 and thus prevent operation of the blower 13.

Without further analysis, the foregoing will so fully reveal the gist of this invention that others can by applying current knowledge readily adapt it for various applications without omitting certain features that, from the standpoint of the prior art, fairly constitute essential characteristics of the generic or specific aspects of this invention, and therefore such adaptations should and are intended to be comprehended within the meaning and range of equivalency of the following claims.

Having thus described my invention what I claim as new and desire to secure by Letters Patent is:

1. In an apparatus of the character set forth, the combination with an engine having exhaust ports, of a manifold adapted to receive the exhaust therefrom, said manifold comprising a chamber divided into a plurality of compartments by a central partition extending at a right angle to the inflow of the exhaust gases, the air-receiving compartment being adapted to conduct the air therethrough in a path at a right angle to the inflow of the exhaust in the other compartment of the chamber, whereby the air passing through said air-compartment is heated by contact with the partition heated by the exhaust, and means for conveying the heated air from the air compartment.

2. In an apparatus of the character set forth, the combination with an engine having exhaust ports, of a manifold adapted to receive the exhaust therefrom, said manifold comprising a chamber divided into a plurality of compartments by a central partition extending at a right angle to the inflow of the exhaust gases, the air-receiving compartment being adapted to conduct the air therethrough in a path at a right angle to the inflow of the exhaust in the other compartment of the chamber, whereby the air passing through said air-compartment is heated by contact with the partition heated by the exhaust, means for forcing air through the air-receiving compartment, and means for conveying the heated air from the air-receiving compartment.

3. In an apparatus of the character set forth, the combination with an engine having exhaust ports, of a manifold adapted to receive the exhaust therefrom, said manifold comprising a chamber divided into a plurality of compartments by a central partition extending at a right angle to the inflow of the exhaust gases, the air-receiving compartment being adapted to conduct the air therethrough in a path at a right angle to the inflow of the exhaust in the other compartment of the chamber, whereby the air passing through said air compartment is heated by contact with the partition heated by the exhaust, baffles in said air-receiving compartment to cause the air to pass through a circuitous path therethrough, and means for conveying the heated air from the compartment.

4. In an apparatus of the character set forth, the combination with an engine having exhaust ports, of a manifold adapted to receive the exhaust therefrom, said manifold comprising a chamber divided into a plurality of compartments by a central partition extending at a right angle to the inflow of the exhaust gases, the air-receiving compartment being adapted to conduct the air therethrough in a path at a right angle to the inflow of the exhaust in the other compartment of the chamber, whereby the air passing through said air compartment is heated by contact with the partition heated by the exhaust, oppositely disposed baffles in said air-receiving compartment to cause the air to pass in a circuitous path therethrough, and means for conveying the heated air from the compartment.

5. In an apparatus of the character set forth, the combination with an engine having exhaust ports, of a manifold adapted to receive the exhaust therefrom, said manifold comprising a chamber divided into a plurality of compartments by a central partition extending at a right angle to the inflow of the exhaust gases, the air-receiving compartment being adapted to conduct the air therethrough in a path at a right angle to the inflow of the exhaust in the other compartment of the chamber, whereby the air passing through said air compartment is heated by contact with the partition heated by the exhaust, oppositely disposed baffles in said air-receiving compartment to cause the air to pass in a circuitous path therethrough, means for conveying the heated air from said compartment, and means for distributing the air within the interior of the automobile.

6. In an apparatus of the character set forth, the combination with an engine having exhaust ports, of a manifold adapted to receive the exhaust therefrom, said manifold comprising a chamber divided into a plurality of compartments by a central partition extending at a right angle to the inflow of the exhaust gases, the air-receiving compartment being adapted to conduct the air therethrough in a path at right angles to the inflow of the exhaust in the other compartment of the chamber, whereby the air passing through said air-compartment is heated by contact with the partition heated by the exhaust, oppositely disposed baffles in said air-receiving compartment to cause the air to pass in a circuitous path therethrough, means for conveying the heated air from said compartment, means for distributing the air within the interior of the automobile, and independent means for controlling the heat distributing means.

In testimony whereof I affix my signature in presence of two witnesses.

GEORGE W. CRIST.

Witnesses:
T. H. McCracken,
Wm. Chitwood.